United States Patent
Rose et al.

(10) Patent No.: US 10,878,412 B2
(45) Date of Patent: Dec. 29, 2020

(54) IN-LINE VERIFICATION OF TRANSACTIONS

(71) Applicant: BRANCH BANKING AND TRUST COMPANY, Winston-Salem, NC (US)

(72) Inventors: Amy Rose, Chapel Hill, NC (US);
David Stone, Wake Forest, NC (US);
Scott Travis Leith, Apex, NC (US);
William Mark Connolly, Raleigh, NC (US)

(73) Assignee: TRUIST BANK, Charlotte, NC (US)

( * ) Notice: Subject to any disclaimer, the term of this patent is extended or adjusted under 35 U.S.C. 154(b) by 22 days.

(21) Appl. No.: 16/410,139

(22) Filed: May 13, 2019

(65) Prior Publication Data

US 2020/0364706 A1    Nov. 19, 2020

(51) Int. Cl.
*H04L 9/32*    (2006.01)
*G06Q 20/38*    (2012.01)
*G06Q 20/40*    (2012.01)

(52) U.S. Cl.
CPC ..... *G06Q 20/3825* (2013.01); *G06Q 20/3829* (2013.01); *G06Q 20/4016* (2013.01); *H04L 9/3236* (2013.01); *H04L 2209/38* (2013.01); *H04L 2209/56* (2013.01)

(58) Field of Classification Search
USPC .................................................. 705/35, 44
See application file for complete search history.

(56) References Cited

U.S. PATENT DOCUMENTS

| | | | | |
|---|---|---|---|---|
| 2017/0301047 A1* | 10/2017 | Brown | ............... | G06Q 20/3827 |
| 2017/0352012 A1* | 12/2017 | Hearn | ............... | G06Q 20/3827 |
| 2018/0300693 A1* | 10/2018 | Gopinath | ........... | G06Q 20/4016 |
| 2019/0180371 A1* | 6/2019 | Benkert | ................ | H04L 9/3263 |
| 2019/0251527 A1* | 8/2019 | Surdak | .................... | G06Q 20/02 |
| 2019/0319798 A1* | 10/2019 | Chalkias | ............... | G06N 10/00 |
| 2019/0378134 A1* | 12/2019 | Asari | ................... | G06Q 20/223 |
| 2020/0005292 A1* | 1/2020 | Mao | ....................... | H04L 9/3247 |
| 2020/0175514 A1* | 6/2020 | Bier | ...................... | H04L 9/3247 |
| 2020/0250633 A1* | 8/2020 | Vinson | .................. | G06Q 20/02 |

OTHER PUBLICATIONS

WalliD: Secure your ID in an Ethereum Wallet Tavers, et. al. (Year: 2018).*

* cited by examiner

*Primary Examiner* — William E Rankins
(74) *Attorney, Agent, or Firm* — Kilpatrick Townsend & Stockton LLP

(57) ABSTRACT

A transaction system can include a notary system and an interceptor for providing security in connection with processing a transaction. The notary system is configured to confirm parameters of the transaction and to apply a signature using a private key to the transaction in response to confirming the parameters. The notary system is also configured to output a signed transaction for execution, and to provide the parameters of the transaction to an immutable ledger. The interceptor can be positioned between a transfer system and a transfer settlement system. The interceptor is configured to intercept the transaction before the transfer settlement system, to confirm that data from the transaction matches information in the immutable ledger, and, in response to confirming that the data matches the information, to provide the transaction for settlement by the transfer settlement system.

6 Claims, 5 Drawing Sheets

IN-LINE VERIFICATION OF TRANSACTIONS

TECHNICAL FIELD

The present disclosure relates generally to computer networks. More particularly, but not exclusively, the present disclosure relates to configuring a computer network to make transactions securely.

BACKGROUND

Sophisticated transactions of goods, funds, or services can be supported by computer networks executing processes to execute and process the transactions. The computer networks may be susceptible to fraud, inadvertent errors, or other issues that can affect the security and integrity of the transactions supported by the computer networks. Although security can be enabled via audits and monitors external to a computer network channel that is processing the transaction, these out-of-band security systems can also be susceptible to fraud. Furthermore, processing speed and accuracy can be affected by reporting processes involving the out-of-band security systems.

SUMMARY

In one example, a transaction system includes a notary system and an interceptor. The notary system is configured to confirm parameters of a transaction and to apply a signature using a private key to the transaction in response to confirming the parameters. The notary system is also configured to output a signed transaction for execution, and to provide the parameters of the transaction to an immutable ledger. The interceptor can be positioned between a transfer system and a transfer settlement system. The interceptor is configured to intercept the transaction before the transfer settlement system, to confirm that data from the transaction matches information in the immutable ledger, and, in response to confirming that the data matches the information, to provide the transaction for settlement by the transfer settlement system.

In another example, a computing device includes a communication port, a processor device, and a non-transitory computer-readable storage memory. The communication port is configured for communicating data with other computing devices. The non-transitory computer-readable storage memory includes code that is executable by the processor device to perform operations. The operations include receiving parameters of a transfer. The operations also include verifying the transfer using a multi-factor authentication process. The operations also include, in response to verifying the transfer, using a private key to countersign the transfer and return, via the communications port, a signed transfer package for execution of the transfer. The operations also include providing, via the communications port, the parameters of the transfer and countersign data to an immutable ledger.

In another example, a computing device includes a communication port, a processor device, and a non-transitory computer-readable storage memory. The communication port is configured for communicating data with other computing devices. The non-transitory computer-readable storage memory includes code that is executable by the processor device to perform operations. The operations include intercepting a transfer prior to a settlement system. The operations also include using a transaction identifier of the transfer to access information from an immutable ledger. The operations also include confirming that the information from the immutable ledger is consistent with data of the transfer. The operations also include, in response to confirming that the information is consistent with the data of the transfer, providing the transfer to the settlement system.

In another example, a method includes receiving, by a notary system comprising a processor device executing code, parameters of a transfer. The method also includes verifying, by the notary system, the transfer using a multi-factor authentication process. The method also includes in response to verifying the transfer, using a private key to countersign the transfer and returning, by the notary system, a signed transfer package for execution of the transfer. The method also includes providing, via the communications port, the parameters of the transfer and countersign data to an immutable ledger. The method also includes intercepting, by an interceptor comprising a processor device executing code, the transfer prior to a settlement system. The method also includes using, by the interceptor, a transaction identifier of the transfer to access information from the immutable ledger. The method also includes confirming that the information from the immutable ledger is consistent with data of the transfer. The method also includes in response to confirming that the information is consistent with the data of the transfer, providing the transfer to the settlement system.

DETAILED DESCRIPTION

Figure 1:
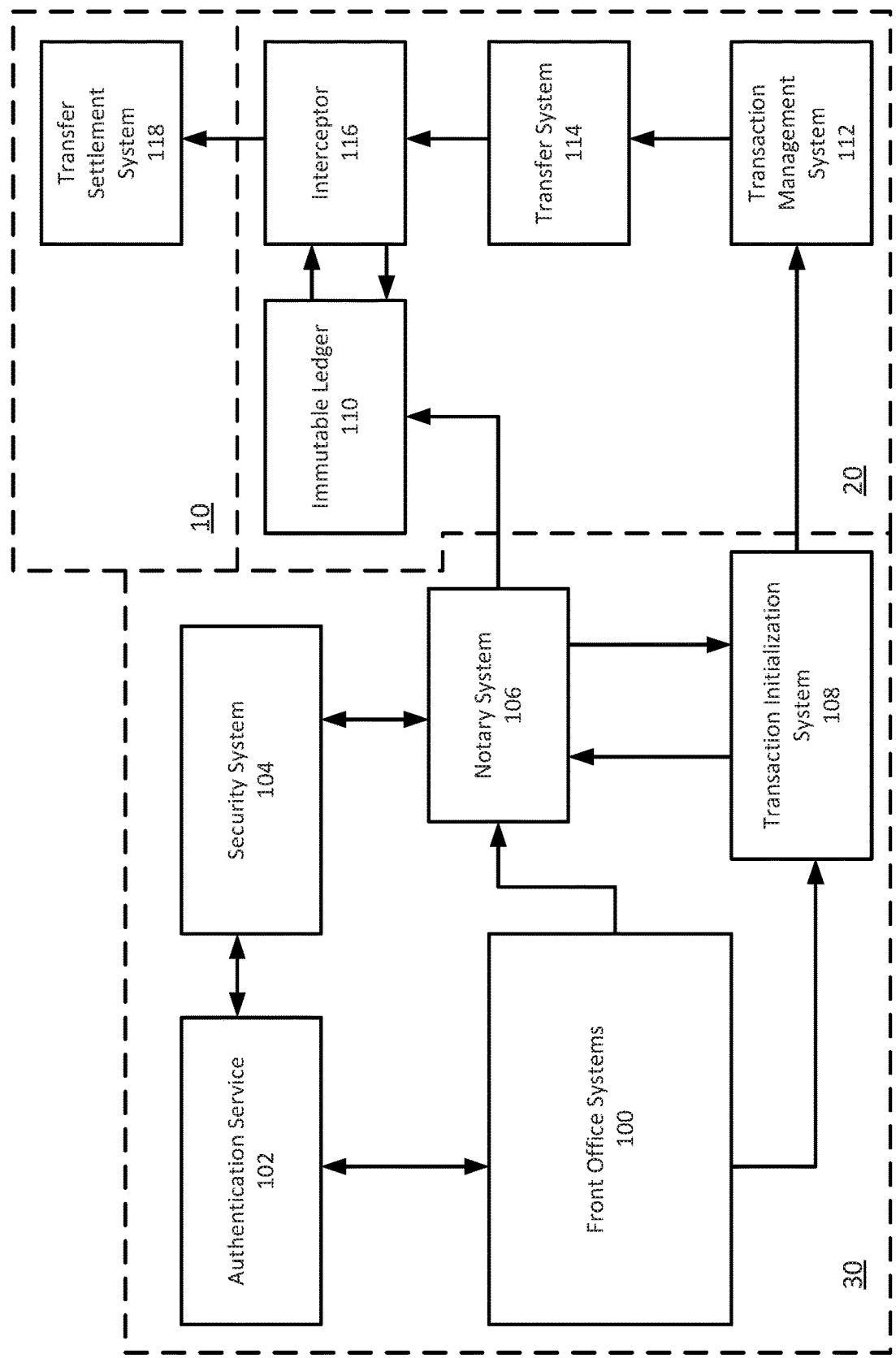
FIG. 1 is a block diagram of an environment for initiating and executing a transaction while also providing enhanced security to prevent fraudulent actions according to one aspect of the present disclosure.

Certain aspects and features relate to using a notary system with the ability to sign transactions using private keys and provide information to an immutable ledger that can be used by an interceptor to verify a transfer for a transaction prior to settlement. The transfer system can include separate systems that may operate independently and may be semi-trustworthy. By using an immutable ledger that is accessible to the notary system and the interceptor, transfers can be verified to reduce security risks and to more likely detect fraudulent transactions.

Risks in networked systems are common. Hackers may enter a network and cause fraudulent actions to occur. The risk can be even higher for financial transaction networks that often include multiple, separate and independent systems that are not completely trusted due to the risk of hackers and other intrusions. A system according to some aspects can prevent fraudulent actions from executing, which can prevent loss in a network such as a financial transaction network to make wire transfers, without introducing burdensome hurdles for users to complete legitimate transactions.

Some examples can provide independent validation and verification of transactions across multiple systems to provide end-to-end integrity of transactions across multiple systems without the systems knowledge. Transactions, such as money movement through a wire system or the exchange of goods, are complex interactions between multiple systems, parties, and vendor codes that have different security and operational risk. For example, three, four, or more systems can be involved in a payment transaction. Hundreds of servers can implement these complex systems and numerous interfaces to those systems (e.g. operators, users, administrators) can make it difficult to protect every system at the highest level. These transactions also go through multiple vendor and third party code/systems that have various level of security, including application security, server configurations and hardening, authentication levels, and various other cyber risks.

By using certain aspects of the present disclosure, one or multiple systems can be compromised within a transaction flow, and that can be detected. And the alteration of a payment can be responded to in an out-of-band network. Examples of fraudulent actions can include fraudulent actions by authorized users, fraudulent actions by unauthorized users or agents using hijacked credentials or sessions (e.g., through user interfaces), fraudulent actions by unauthorized users or agents using data injection or data tampering (e.g., interception and manipulation, creation, replay), or a combination of these or other types of fraudulent actions. Unintentional mistakes by users or agents may also result in actions that can be considered fraudulent, even if such actions may be unintentional.

When an altered payment is detected, the out-of-network users can take one or more actions to control the flow of data and payment transactions within systems. Examples of actions include stopping the transaction, altering the transaction before sending, and approving and sending the transaction. Any payments that are detected as changed across these multiple systems can be stopped for inspection and, based on established processes, stopped or sent on to the appropriate payment method (e.g. CHIPS, SWIFT, Fedwire).

Certain aspects can allow for the extensibility of technology and cryptographic validation technologies. This can be used to validate payment movements across various external partners and vendors, and include initiatives such as a "safe harbor."

In some examples, a notary system can be included with a transaction initiator system to receive a definition of a transfer (e.g., source account, target account, and amount or type of goods or services). The notary system can electronically sign a transaction after verifying credentials from an initiator and approver. The notary system can have trusted public keys that can be used to verify a digital signature from the transaction initiator system. The notary system can also have private keys that can be used to countersign the transaction before providing the signed transaction to the immutable ledger and for further execution. Information about the transaction and the notary system's signature of it can be stored in an immutable ledger and provided to a transfer system (such as a money transfer system (MTS)) for further execution. Rather than completely trusting the transaction, the transfer system can partially trust the transaction and provide the transaction to an interceptor, before a transaction settlement system, that can further verify the transaction using the immutable ledger before allowing the transaction to be provided to the transaction settlement system for settlement.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a block diagram of an environment for initiating and executing a transaction while also providing enhanced security to prevent fraudulent actions according to one aspect of the present disclosure. Included in the environment are systems that can be in a logically isolated zone 10, a semi-isolated zone 20, or in a non-isolated zone 30 from user input and actions such that some systems are more inherently trustworthy than other systems. The systems can be communicatively coupled via one or more communication networks that may be wireless, wired, or a combination of both. Examples of a communication network that may be used include synchronous communication networks, asynchronous communication networks, Wi-Fi networks, backhaul networks, WLAN networks, cellular networks, Internet Protocol networks, or any other type of suitable communication networks for communicating data electronically, optically, or electromagnetically.

Included in a non-isolated zone 30 are systems that include front office systems 100, an authentication service 102 and security system 104, a notary system 106, and a transaction initialization system 108, such as a wire-payment-initialization system. The front office systems 100 can include systems by which users can initiate a transaction and approve a transaction. Examples of front office systems 100 include electronic systems at branch locations, at a centralized corporate center, real estate loan systems, international transaction systems, and point-of-sale terminals. The authentication service 102 and security system 104 can be used to provide front office system users with credentials or to confirm credentials, such as user name and password combinations received from the users. In some examples, the security system 104 can be a source of public keys that are used to apply a designation to a transaction that it complies with certain security procedures with respect to front end users. The security system 104 can also provide public keys or verifications to the notary system 106. An example of the authentication service 102 is a system that implements Kerberos authentication, such as by implementing a Kerberos protocol as a security support provider. An example of the security system 104 is a system that implements or supports a multi-factor authentication process for the authentication service 102. The notary system 106 can verify a digital signature from the front office systems 100 using public keys and can use private keys to digitally sign the transaction in response to verifying the digital signature. The transaction initialization system 108 can be an interface to the systems in semi-isolated zone 20. An example of the transaction initialization system 108 is a WPI.

Included in the semi-isolated zone 20 are an immutable ledger 110, a transaction management system 112, a transfer system 114, and an interceptor 116. The immutable ledger 110 can be a blockchain, openchain, or other type of electronically stored ledger that is accessible to multiple systems to update and receive transaction history. In some examples, the immutable ledger 110 is stored in a computer-readable medium on a device having network communications capabilities by which other devices can provide updates to the immutable ledger 110 and receive data from the immutable ledger 110.

The transaction management system 112 may be a financial transaction manager (FTM) system that can process and monitor financial transactions. For example, the transaction management system 112 can receive a transaction to be executed from the transaction initialization system 108, use trusted certificates and rules to prepare the transfer for execution, and track its status as the transaction is executed. The transfer system 114 may be a money transfer system (MTS) that can provide payment-processing capabilities across multiple systems and further process transactions for settlement. In some examples, the transfer system 114 verifies digital signatures of a transfer or transaction.

The interceptor 116 can be a computing device that is positioned between the transfer system 114 and a transfer settlement system 118 that is in the isolated zone 10. The interceptor can intercept a transaction before settlement, access information from the immutable ledger 110, and verify the transaction prior to allowing the transaction to be settled by the transfer settlement system 118. Examples of the transfer settlement system 118 include Fedwire, CHIPS, and SWIFT.

By providing transaction information from the notary system 106, which digitally signs the transaction, to the immutable ledger 110, and allowing that information to be accessed and used for verification by the interceptor 116 prior to settlement, fraudulent actions that may be introduced between the notary system 106 and the interceptor 116 by the various systems can be detected.

Figure 2:
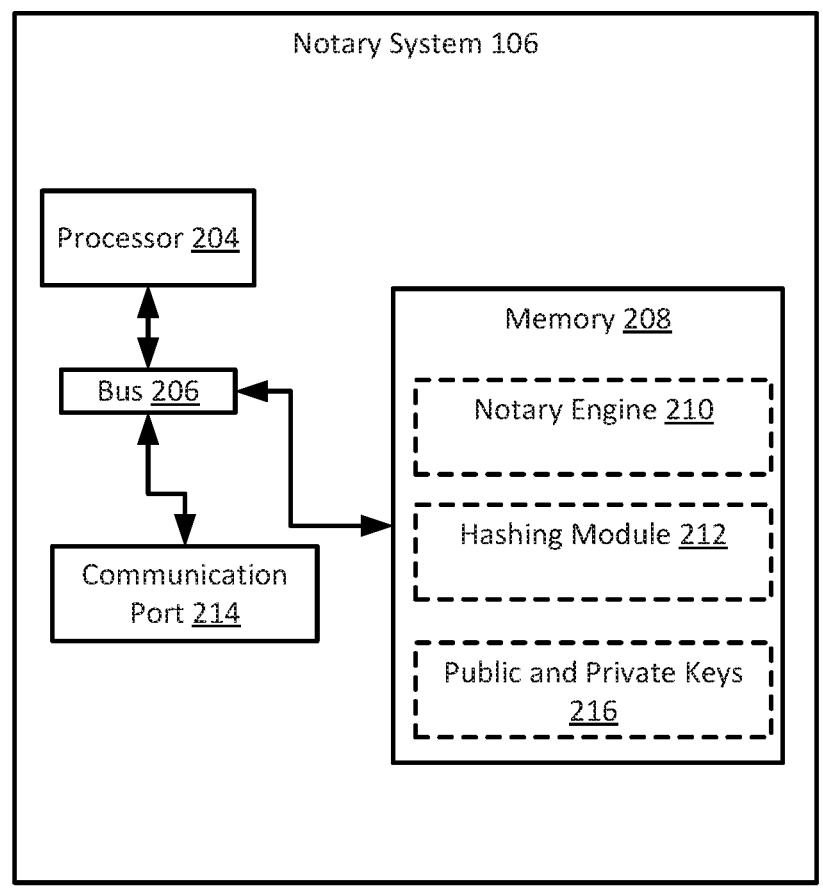
FIG. 2 is a block diagram of an example of a notary system according to one aspect of the present disclosure.

FIG. 2 is a block diagram of an example of a notary system 106 according to some aspects. The notary system 106 can include a processor 204, a memory 208, a bus 206, and a communication port 214. In some examples, some or all of the components shown in FIG. 2 can be integrated into a single structure, such as a single housing. In other examples, some or all of the components shown in FIG. 2 can be distributed (e.g., in separate housings) and in electrical communication with each other.

The processor 204 can execute one or more operations for verifying a transaction, digitally signing the transaction, and outputting transaction data to other systems. The processor 204 can execute instructions stored in the memory 208 to perform the operations. The processor 204 can include one processing device or multiple processing devices. Non-limiting examples of the processor 204 include a Field-Programmable Gate Array ("FPGA"), an application-specific integrated circuit ("ASIC"), a microprocessor, etc.

The processor 204 can be communicatively coupled to the memory 208 via the bus 206. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc. The instructions can include a notary engine 210 that is executable by the processor 204. Also included in memory 208 is a copy is hashing module 212 and public and private keys 216.

Data can be transmitted and received with other computing devices via the communication port 214. The communication port 214 can include hardware, or a combination of hardware and software, for communicating with a communications network. In one example, the communication port 214 includes a transceiver and an antenna for wirelessly communicating data. In another example, the communication port 214 is an Ethernet port that can communicate Internet Protocol data via a wired link.

Figure 3:
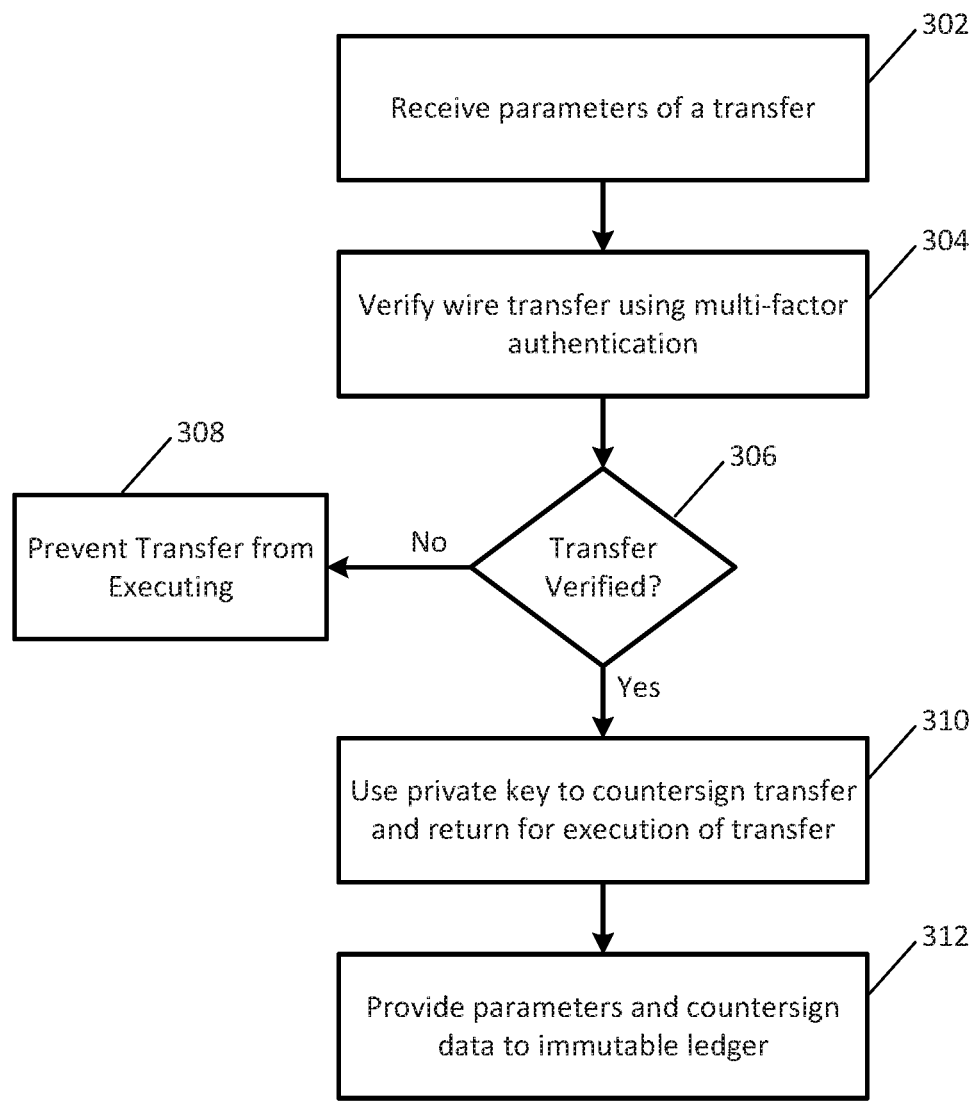
FIG. 3 is a flow chart of a process of a notary system verifying a transaction and digitally signing a verified transaction according to one aspect of the present disclosure.

FIG. 3 is a flow chart of a process of a notary system verifying a transaction and digitally signing a verified transaction according to one aspect of the present disclosure. The process is described with reference to the block diagrams of FIGS. 1 and 2, but other system-architecture implementations are possible.

In block 302, the notary system 106 receives parameters of a transfer. An example of the transfer is a wire transfer of funds. The notary system 106 can receive the parameters from a front office system. The parameters can be received as part of bundle transaction. The parameters can include credentials of an initiator and an approver for the transfer, along with an operator identifier. The parameters can also include a transaction identifier, an amount to be transferred, a source account, and a destination account. The parameters can be received via the communication port 214 from a communications network.

In block 304, the notary system 106 verifies the transfer using multi-factor authentication. For example, the notary system 106 can include trusted public keys that can be used to verify the digital signature of the front office system. And, the notary system 106 can interface with the security system 104 to implement a multi-factor authentication process with the user of the front office system to verify the transaction.

In block 306, the notary system 106 determines whether the transfer is verified based on considering the public keys included in the transfer and the result of the multi-factor authentication process. If the transfer is not verified, the notary system 106 prevents the transfer from executing in block 308. For example, the notary system 106 can output a command to other system components to prevent a particular transaction or transfer from executing, or the notary system 106 can output the transfer or transaction without any digital signature, in which case the other components will not continue processing the transaction.

If the transfer is verified, the notary system 106 uses private keys to countersign the transfer and return the transfer for execution by other components, such as the transaction initialization system 108, in block 310. And, the notary system provides parameters about the transfer and countersign data to the immutable ledger 110. Examples of data that are stored by the immutable ledger 110 include transaction identifier, amount, source account, destination account, digital signature of initiator, along with time stamps associated with each data element. In some examples, the notary system 106 can use the hashing module 212 to hash the transfer parameters and digital signature prior to returning the transfer for execution and providing the data to the immutable ledger 110. In other examples, the system hosting the immutable ledger 110 includes a hashing module 212 to hash the data prior to storing in the immutable ledger and the transaction that is returned for execution is not hashed.

The transaction can be digitally signed by private keys using any private key process, an example of which is x.509v3 certificate management in a public key infrastructure. The transaction can then be executed by the transaction initialization system 108, transaction management system 112, and transfer system 114 prior to being intercepted by the interceptor 116.

Figure 4:
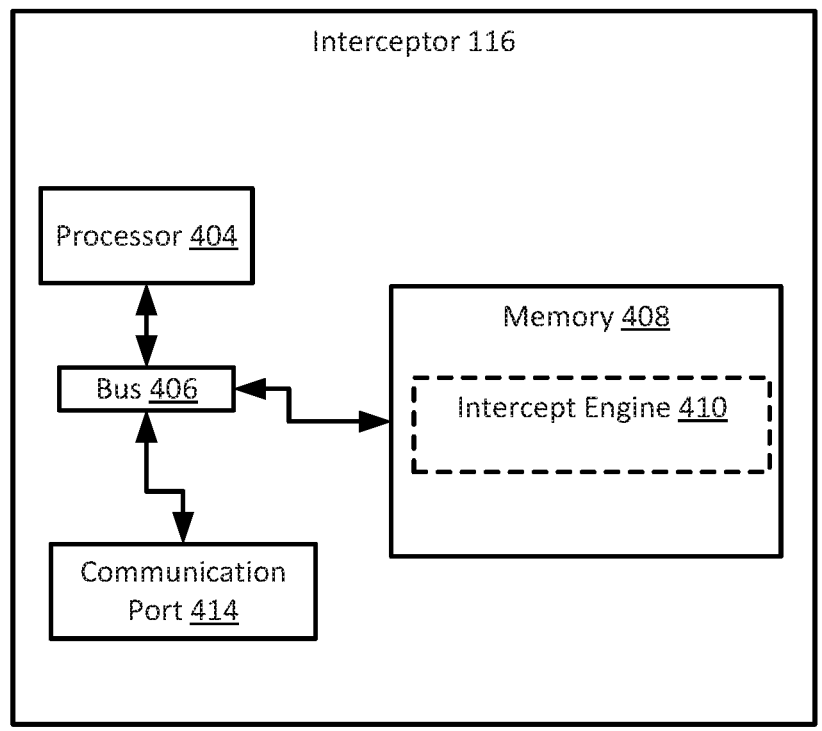
FIG. 4 is a block diagram of an example of an interceptor according to one aspect of the present disclosure.

FIG. 4 is a block diagram of an example of an interceptor 116 according to some aspects. The interceptor 116 can include a processor 404, a memory 408, a bus 406, and a communication port 414. The processor 404 can execute one or more operations for verifying a transaction and outputting transaction data to other systems. The processor 404 can execute instructions stored in the memory 408 to perform the operations. The processor 404 can be similar to processor 204 in FIG. 2 and be one or more of the same examples.

The processor 404 can be communicatively coupled to the memory 408 via the bus 406. The non-volatile memory 408 is similar to the memory 208 from FIG. 2 and include one or more of the same examples as that memory. The instructions can include an intercept engine 410 that is executable by the processor 404 to perform operations, some of which are described below with respect to FIG. 5. Data can be transmitted and received with other computing devices via the communication port 414. The communication port 414 can include hardware, or a combination of hardware and software, for communicating with a communications network.

Figure 5:
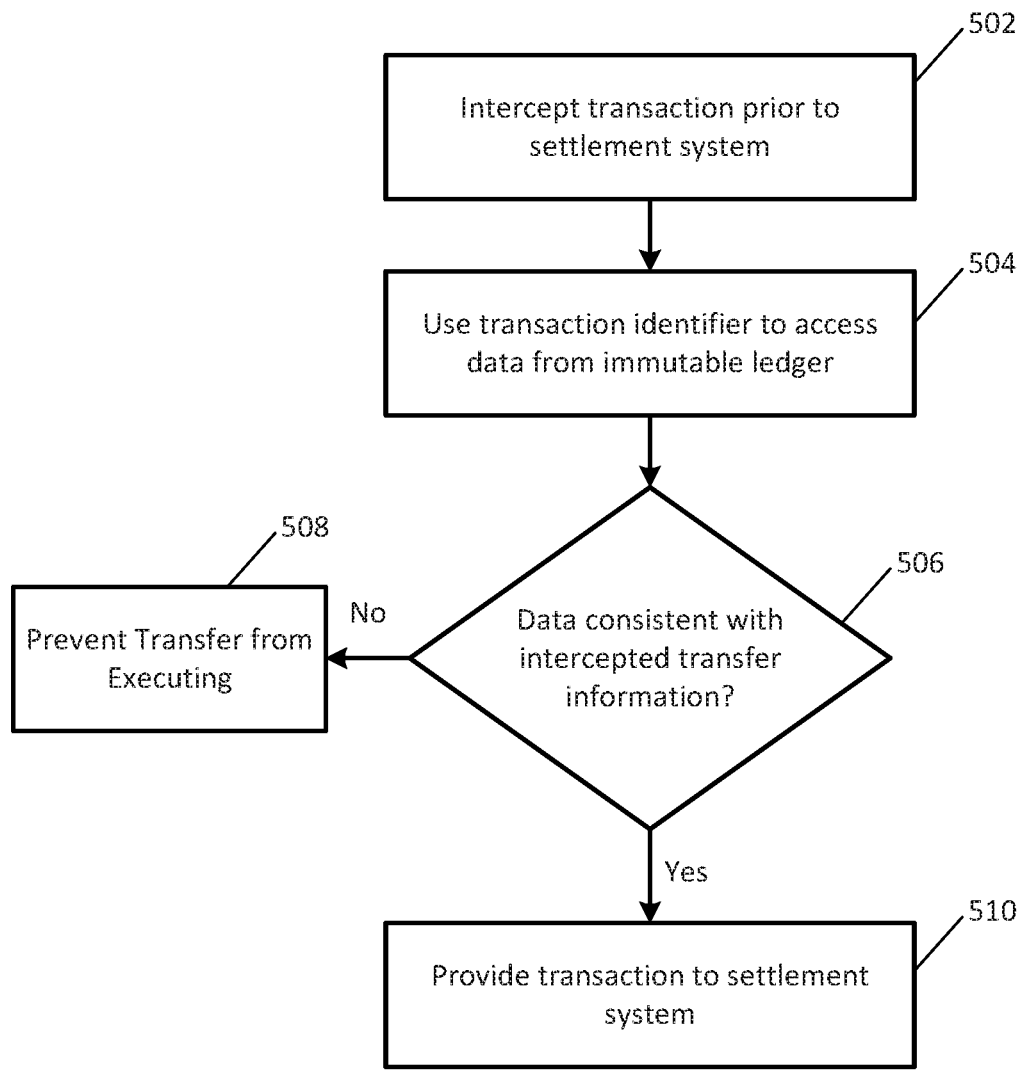
FIG. 5 is a flow chart of a process of an interceptor verifying a transaction according to one aspect of the present disclosure.

FIG. 5 is a flow chart of a process of an interceptor verifying a transaction according to one aspect of the present disclosure. The process is described with reference to the block diagrams of FIGS. 1 and 4, but other system-architecture implementations are possible.

In block 502, the interceptor 116 intercepts a transaction prior to the transfer settlement system 118. For example, the interceptor 116 may be placed in a data transmission path between the transfer system 114 and the transfer settlement system 118, or the transfer settlement system 118 can refuse to settle transactions unless the interceptor 116 has verified the transaction. Transaction data can be received from a network via the communication port 414. The transaction data can include a transaction identifier, source account, destination account, amount, and digital signatures from the notary system 106 and other systems and users required to provide digital signatures prior to the transaction being further processed.

In block 504, the interceptor 116 uses the transaction identifier or other information about the transaction to access data from the immutable ledger 110. In some examples, the interceptor 116 can make a call to the immutable ledger 110 to request data associated with the transaction identifier, including historical data that is no longer updated. In other examples, the interceptor 116 receives a current ledger, with the transaction information and information about other transactions, and uses the current ledger for analysis.

In block 506, the interceptor 116 determines whether data from the ledger is consistent with intercepted transfer information in the transaction. For example, the interceptor 116 can require that the transaction information—source account, destination account, digital signatures, etc.—match exactly the transaction data from the immutable ledger 110. In some examples, the interceptor 116 includes a hashing module that is executable to un-hash values of data or to interpret hashed values of data from the immutable ledger 110 so that the data can be compared to the information.

If the data is not consistent with the intercepted transfer information, the interceptor 116 can prevent the transfer from further executing in block 508. For example, the interceptor 116 can prevent the transaction from proceeding the transfer settlement system 118 and can output a notification in an out-of-band channel (e.g., a channel other than a transfer processing data flow channel) to analyze the transaction closer for fraud.

If the data is consistent with the intercepted transfer information, the interceptor 116 can provide the transaction to the transfer settlement system 118 for settlement in block 510.

Numerous specific details are set forth herein to provide a thorough understanding of the claimed subject matter. But, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A transaction system comprising:
a notary system comprising a processor device and that is configured to confirm parameters of a transaction, to apply a signature using a private key to the transaction in response to confirming the parameters, to output a signed transaction for execution, and to provide the parameters of the transaction to an immutable ledger; and
an interceptor comprising a processing device and that is positionable between a transfer system and a transfer settlement system, the interceptor configured to intercept the transaction before the transfer settlement system, to confirm that data from the transaction matches information in the immutable ledger, and, in response to confirming that the data matches the information, to provide the transaction for settlement by the transfer settlement system.

2. The transactions system of claim 1, wherein the transaction is a wire transfer of funds from a first account to a second account.

3. The transactions system of claim 1, wherein the notary system is in a non-isolated zone accessible to users and the interceptor is in a semi-isolated zone that is semi-accessible to the users.

4. The transactions system of claim 3, further comprising in the non-isolated zone:
a plurality of front office systems usable by front-end users to initiate the transaction and approve the transaction;
an authentication service system and a security system configured to provide the front-end users with credentials and to confirm credentials received via the plurality of front office systems via a multi-factor authentication process; and
a transaction initialization system configured to interface with subsystems in the semi-isolated zone,
wherein the notary system is configured to use public keys to verify a digital signature from at least one front office system of the plurality of front office systems and to use private keys to digitally sign the transaction in response to verifying the digital signature.

5. The transactions system of claim 4, further comprising:
the immutable ledger electronically stored on a device in the semi-isolated zone and configured to be accessible to a plurality of systems to update, receive, and store transaction history data;
a transaction management system in the semi-isolated zone and configured to receive the transaction to be executed from the transaction initialization system, to use trusted certificates and rules to prepare the transaction for execution, and track a status of the transaction through execution;
a transfer system in the semi-isolated zone configured to verify one or more digital signatures of the transaction; and
the interceptor in the semi-isolated zone,
wherein the transfer settlement system is positionable in an isolated zone of the transactions system that is isolated from users.

6. The transactions system of claim 1, wherein the interceptor is configured to prevent the transaction from executing in response to failing to confirm that the data from the transaction matches the information in the immutable ledger.

* * * * *